(12) United States Patent
Geppert et al.

(10) Patent No.: US 9,344,396 B2
(45) Date of Patent: May 17, 2016

(54) SYSTEM AND METHOD FOR PERSISTENT MULTIMEDIA CONFERENCING SERVICES

(75) Inventors: Birgit Geppert, Basking Ridge, NJ (US); Frank Roessler, Basking Ridge, NJ (US)

(73) Assignee: Avaya Inc., Santa Clara, CA (US)

(*) Notice: Subject to any disclaimer, the term of this patent is extended or adjusted under 35 U.S.C. 154(b) by 351 days.

(21) Appl. No.: 12/749,103

(22) Filed: Mar. 29, 2010

(65) Prior Publication Data

US 2010/0251142 A1 Sep. 30, 2010

Related U.S. Application Data

(60) Provisional application No. 61/164,753, filed on Mar. 30, 2009.

(51) Int. Cl.
*G06F 3/00* (2006.01)
*H04L 12/58* (2006.01)
(Continued)

(52) U.S. Cl.
CPC .............. *H04L 51/36* (2013.01); *G06F 3/0486* (2013.01); *G06F 3/04817* (2013.01); *G06F 3/04842* (2013.01); *H04L 12/1822* (2013.01); *H04L 51/046* (2013.01); *H04L 65/1069* (2013.01);
(Continued)

(58) Field of Classification Search
CPC .............................. G06F 3/0481; G06Q 10/10
USPC .................................................. 715/753, 758
See application file for complete search history.

(56) References Cited

U.S. PATENT DOCUMENTS 5,195,086 A   3/1993   Baumgartner et al.
5,500,934 A   3/1996   Austin et al.
(Continued)

FOREIGN PATENT DOCUMENTS

CN   1292127    4/2001
DE   19543870   5/1996
(Continued)

OTHER PUBLICATIONS

WebEx, WebEx Meeting Center User's Guide, 2007, WebEx Communications Inc., Version 8, pp. 1-332.*
(Continued)

*Primary Examiner* — Ryan Pitaro
(74) *Attorney, Agent, or Firm* — Sheridan Ross P.C.

(57) ABSTRACT

Disclosed herein are systems, methods, and non-transitory computer-readable storage media for managing a virtual meeting room communication session. The method includes establishing a persistent virtual meeting room communication session, the virtual meeting room communication session including shared resources available to virtual meeting room communication session participants, displaying to meeting participants a set of connected graphical elements representing a structure of the virtual meeting room communication session via a graphical user interface (GUI), receiving from one of the meeting participants input associated with the set of connected graphical elements, the input having an action associated with the virtual meeting room communication session, and performing the action based on received user input. The virtual meeting room communication session can persist when no participants are in the communication session. The persistent virtual meeting room can record changes in session context such as a record of session control events, resource changes, and participant listings.

32 Claims, 7 Drawing Sheets

(51) Int. Cl.

| | |
|---|---|
| *G06F 3/0481* | (2013.01) |
| *G06F 3/0486* | (2013.01) |
| *H04L 12/18* | (2006.01) |
| *H04M 1/247* | (2006.01) |
| *H04M 3/56* | (2006.01) |
| *H04W 4/20* | (2009.01) |
| *H04L 29/06* | (2006.01) |
| *G06F 3/0484* | (2013.01) |
| *G06Q 10/10* | (2012.01) |
| *H04M 1/2745* | (2006.01) |
| *H04M 3/42* | (2006.01) |

(52) U.S. Cl.
CPC ............ *H04L 65/403* (2013.01); *H04M 1/247* (2013.01); *H04M 1/27455* (2013.01); *H04M 3/563* (2013.01); *H04W 4/206* (2013.01); *G06Q 10/10* (2013.01); *H04L 12/581* (2013.01); *H04L 51/04* (2013.01); *H04M 1/274508* (2013.01); *H04M 3/42068* (2013.01); *H04M 3/42161* (2013.01); *H04M 3/42221* (2013.01); *H04M 3/42289* (2013.01); *H04M 3/564* (2013.01); *H04M 2201/42* (2013.01); *H04M 2203/5027* (2013.01); *H04M 2250/22* (2013.01); *H04M 2250/62* (2013.01)

(56) References Cited

U.S. PATENT DOCUMENTS

| | | | | |
|---|---|---|---|---|
| 5,533,110 | A * | 7/1996 | Pinard et al. | 379/355.01 |
| 5,627,978 | A | 5/1997 | Altom et al. | |
| 5,745,711 | A * | 4/1998 | Kitahara et al. | 715/759 |
| 5,768,552 | A | 6/1998 | Jacoby | |
| 5,892,764 | A * | 4/1999 | Riemann et al. | 370/401 |
| 5,896,128 | A | 4/1999 | Boyer | |
| 5,940,488 | A * | 8/1999 | DeGrazia et al. | 379/93.23 |
| 5,949,414 | A | 9/1999 | Namikata et al. | |
| 5,999,609 | A | 12/1999 | Nishimura | |
| 6,067,357 | A | 5/2000 | Kishinsky et al. | |
| 6,191,807 | B1 * | 2/2001 | Hamada et al. | 348/14.07 |
| 6,278,454 | B1 | 8/2001 | Krishnan | |
| 6,415,020 | B1 | 7/2002 | Pinard et al. | |
| 6,445,682 | B1 * | 9/2002 | Weitz | 370/257 |
| 6,496,201 | B1 | 12/2002 | Baldwin et al. | |
| 6,501,740 | B1 * | 12/2002 | Sun et al. | 370/261 |
| 6,559,863 | B1 | 5/2003 | Megiddo | |
| 6,751,669 | B1 | 6/2004 | Ahuja et al. | |
| 6,853,398 | B2 * | 2/2005 | Malzbender et al. | 348/14.09 |
| D528,553 | S | 9/2006 | Nevill-Manning et al. | |
| D529,036 | S | 9/2006 | Koch et al. | |
| D529,037 | S | 9/2006 | Koch et al. | |
| D529,920 | S | 10/2006 | Nevill-Manning et al. | |
| 7,124,164 | B1 | 10/2006 | Chemtob | |
| 7,127,685 | B2 | 10/2006 | Canfield et al. | |
| 7,162,699 | B1 * | 1/2007 | Pena-Mora et al. | 715/751 |
| 7,167,182 | B2 * | 1/2007 | Butler | 345/537 |
| 7,213,206 | B2 | 5/2007 | Fogg | |
| 7,269,162 | B1 | 9/2007 | Turner | |
| 7,478,129 | B1 * | 1/2009 | Chemtob | 709/204 |
| D591,304 | S | 4/2009 | Banks et al. | |
| 7,519,912 | B2 | 4/2009 | Moody et al. | |
| D603,866 | S | 11/2009 | Banks et al. | |
| 7,949,952 | B2 * | 5/2011 | Hawley et al. | 715/751 |
| 8,082,302 | B2 * | 12/2011 | Becker et al. | 709/204 |
| 8,144,633 | B2 | 3/2012 | Yoakum et al. | |
| 8,223,186 | B2 * | 7/2012 | Derocher et al. | 348/14.01 |
| 8,243,902 | B2 | 8/2012 | Caspi et al. | |
| 8,786,664 | B2 | 7/2014 | Hornyak et al. | |
| 2003/0001890 | A1 | 1/2003 | Brin | |
| 2003/0133562 | A1 * | 7/2003 | Ooki | 379/242 |
| 2003/0206619 | A1 | 11/2003 | Curbow et al. | |
| 2003/0236835 | A1 | 12/2003 | Levi et al. | |
| 2004/0019683 | A1 * | 1/2004 | Lee et al. | 709/227 |
| 2004/0028199 | A1 | 2/2004 | Carlson | |
| 2004/0125937 | A1 | 7/2004 | Turcan et al. | |
| 2004/0218751 | A1 | 11/2004 | Colson et al. | |
| 2004/0258222 | A1 | 12/2004 | Kobrosly et al. | |
| 2004/0264652 | A1 | 12/2004 | Erhart et al. | |
| 2005/0021624 | A1 | 1/2005 | Herf et al. | |
| 2005/0132012 | A1 | 6/2005 | Muller et al. | |
| 2005/0141694 | A1 | 6/2005 | Wengrovitz | |
| 2005/0151836 | A1 | 7/2005 | Ni | |
| 2005/0182745 | A1 | 8/2005 | Dhillon et al. | |
| 2005/0251555 | A1 | 11/2005 | Little | |
| 2006/0019655 | A1 | 1/2006 | Peacock | |
| 2006/0023859 | A1 | 2/2006 | Crockett et al. | |
| 2006/0031332 | A1 * | 2/2006 | Brownholtz et al. | 709/206 |
| 2006/0059236 | A1 | 3/2006 | Sheppard et al. | |
| 2006/0098793 | A1 | 5/2006 | Erhart et al. | |
| 2006/0117264 | A1 | 6/2006 | Beaton et al. | |
| 2006/0135142 | A1 | 6/2006 | Repka | |
| 2006/0190546 | A1 | 8/2006 | Daniell | |
| 2006/0235716 | A1 | 10/2006 | Mahesh et al. | |
| 2006/0236269 | A1 | 10/2006 | Borna | |
| 2007/0053308 | A1 | 3/2007 | DuMas et al. | |
| 2007/0121893 | A1 | 5/2007 | Khouri et al. | |
| 2007/0201674 | A1 | 8/2007 | Annadata et al. | |
| 2007/0206768 | A1 | 9/2007 | Bourne et al. | |
| 2007/0208806 | A1 | 9/2007 | Mordecai et al. | |
| 2007/0260685 | A1 * | 11/2007 | Surazski | 709/204 |
| 2007/0279484 | A1 | 12/2007 | Derocher et al. | |
| 2007/0288627 | A1 | 12/2007 | Abella et al. | |
| 2008/0005235 | A1 | 1/2008 | Hegde et al. | |
| 2008/0043963 | A1 | 2/2008 | Kondapalli et al. | |
| 2008/0075247 | A1 | 3/2008 | Tanaka et al. | |
| 2008/0080386 | A1 | 4/2008 | Calahan et al. | |
| 2008/0115087 | A1 * | 5/2008 | Rollin et al. | 715/811 |
| 2008/0120371 | A1 | 5/2008 | Gopal | |
| 2008/0148156 | A1 * | 6/2008 | Brewer et al. | 715/738 |
| 2008/0167056 | A1 * | 7/2008 | Gilzean et al. | 455/466 |
| 2008/0263475 | A1 | 10/2008 | Hwang | |
| 2008/0266378 | A1 | 10/2008 | Ryu | |
| 2008/0309617 | A1 | 12/2008 | Kong et al. | |
| 2009/0006980 | A1 * | 1/2009 | Hawley et al. | 715/752 |
| 2009/0019367 | A1 * | 1/2009 | Cavagnari et al. | 715/716 |
| 2009/0024952 | A1 | 1/2009 | Brush et al. | |
| 2009/0054107 | A1 | 2/2009 | Feland, III et al. | |
| 2009/0059818 | A1 * | 3/2009 | Pickett | 370/259 |
| 2009/0089683 | A1 * | 4/2009 | Thapa | 715/756 |
| 2009/0138554 | A1 * | 5/2009 | Longobardi et al. | 709/204 |
| 2009/0204904 | A1 | 8/2009 | Mujkic et al. | |
| 2009/0241031 | A1 * | 9/2009 | Gamaley et al. | 715/736 |
| 2009/0248709 | A1 | 10/2009 | Fuhrmann et al. | |
| 2009/0249226 | A1 * | 10/2009 | Manolescu et al. | 715/757 |
| 2009/0319623 | A1 | 12/2009 | Srinivasan et al. | |
| 2010/0011304 | A1 | 1/2010 | van Os | |
| 2010/0023585 | A1 | 1/2010 | Nersu et al. | |
| 2010/0076807 | A1 | 3/2010 | Bells et al. | |
| 2010/0083137 | A1 | 4/2010 | Shin et al. | |
| 2010/0085417 | A1 | 4/2010 | Satyanarayanan et al. | |
| 2010/0162153 | A1 * | 6/2010 | Lau | 715/769 |
| 2010/0167710 | A1 * | 7/2010 | Alhainen | 455/416 |
| 2010/0223089 | A1 | 9/2010 | Godfrey et al. | |
| 2010/0234052 | A1 | 9/2010 | Lapstun et al. | |
| 2010/0246791 | A1 | 9/2010 | Wang et al. | |
| 2010/0273447 | A1 | 10/2010 | Mann et al. | |
| 2010/0312836 | A1 | 12/2010 | Serr et al. | |
| 2011/0022968 | A1 * | 1/2011 | Conner et al. | 715/753 |
| 2011/0109940 | A1 | 5/2011 | Silverbrook et al. | |
| 2011/0151905 | A1 | 6/2011 | Lapstun et al. | |
| 2011/0191136 | A1 | 8/2011 | Bourne et al. | |
| 2011/0222675 | A1 | 9/2011 | Chua et al. | |
| 2011/0296312 | A1 | 12/2011 | Boyer et al. | |
| 2012/0019610 | A1 | 1/2012 | Hornyak et al. | |
| 2012/0083252 | A1 | 4/2012 | Lapstun et al. | |
| 2012/0084672 | A1 * | 4/2012 | Vonog et al. | 715/756 |
| 2012/0110473 | A1 | 5/2012 | Tseng | |
| 2012/0216129 | A1 | 8/2012 | Ng et al. | |
| 2012/0259633 | A1 | 10/2012 | Aihara et al. | |
| 2013/0080954 | A1 | 3/2013 | Carlhian et al. | |
| 2013/0108035 | A1 | 5/2013 | Lyman | |

(56) References Cited

U.S. PATENT DOCUMENTS

2013/0250038 A1    9/2013    Satyanarayanan et al.
2013/0268866 A1    10/2013    Lyman

FOREIGN PATENT DOCUMENTS

| | | |
|---|---|---|
| DE | 19716316 | 10/1998 |
| EP | 0453128 | 10/1991 |
| EP | 0717544 | 6/1996 |
| EP | 1480422 | 11/2004 |
| EP | 1983729 | 10/2008 |
| GB | 2338146 | 12/1999 |
| JP | H7-74834 | 3/1995 |
| JP | H08-251261 | 9/1996 |
| JP | 2004-199644 | 2/1997 |
| JP | 2002-297873 | 10/2002 |
| JP | 2003-296556 | 10/2003 |
| JP | 2004-102389 | 4/2004 |
| JP | H09-055983 | 7/2004 |
| JP | 2004-320235 | 11/2004 |
| JP | 2005-318055 | 11/2005 |
| JP | 2006-050370 | 2/2006 |
| JP | 2006-060340 | 3/2006 |
| JP | 2006-092367 | 4/2006 |
| JP | 2007-004000 | 1/2007 |
| JP | 2007-13694 | 1/2007 |
| JP | 2007-143144 | 6/2007 |
| JP | 2008-171068 | 7/2008 |
| JP | 2009-20829 | 1/2009 |
| JP | 2009-502048 | 1/2009 |
| JP | 2009-044679 | 2/2009 |
| KR | 2006-0058872 | 6/2006 |
| KR | 2006-0132484 | 12/2006 |
| KR | 2009-0001500 | 1/2009 |
| WO | WO 9821871 | 5/1998 |
| WO | WO 9945716 | 9/1999 |
| WO | WO 0018082 | 3/2000 |
| WO | WO 2006/054153 | 6/2006 |
| WO | WO 2006/060340 | 6/2006 |
| WO | WO 2007/008321 | 1/2007 |

OTHER PUBLICATIONS

Honda et al., "e-MulCS; Multi-Party Conference System with Virtual Space and the Intuitive Input Interface", Proceedings of the 2004 International Symposium on Applications and the Internet (SAINT '04) pp. 56-63, 2004.

Byrne et al., "Developing multiparty conferencing services for the NGN: towards a service creation framework", Jun. 2004, ISICT '04: Proceedings of the 2004 International Symposium on Information and Communication.

* cited by examiner

SYSTEM AND METHOD FOR PERSISTENT MULTIMEDIA CONFERENCING SERVICES

RELATED APPLICATIONS

This application is related to (application Ser. No. 12/749,028), (application Ser. No. 12/749,058), (application Ser. No. 12/749,094), (application Ser. No. 12/749,123), (application Ser. No. 12/749,150), (application Ser. No. 12/749,178), and (application Ser. No. 12/749,122, now U.S. Pat. No. 8,938,677, issued Jan. 20, 2015), all filed on Mar. 29, 2010, each of which is herein incorporated by reference.

BACKGROUND

1. Technical Field

The present disclosure relates to telecommunications and more specifically to displaying and managing persistent virtual conference room communication sessions via a graphical user interface (GUI). Communication sessions can exist in a variety of modes such as telephone calls, communication sessions, instant messaging sessions, email sessions, video conference sessions, multi-media sessions, and the like.

2. Introduction

Touchtone telephones have been supplemented over the years by the addition of feature buttons and menus. Interfaces for these features have evolved from simple buttons to hierarchical menus actuated by trackballs, quadrant style pointers, and the like. As the number of features increases, the interfaces add more buttons, sequences, and/or combination of button presses. This proliferation of features has led to a multitude of different interfaces with varying levels of complexity. Often users resort to rote memorization of key features, but that is not always practical or desirable. Recently, smartphones with touch-sensitive displays have begun to provide similar functionality. However, the touch-sensitive displays in such devices typically reproduce the feature buttons and menus, albeit on a touch-sensitive display.

Further, users are migrating to other communication forms, such as text messaging, instant messaging, email, chat sessions, video conferencing, and so forth. Incorporating the ability to handle these modes of communication into a traditional telephone increases the complexity and difficulty manyfold.

With the rise in mobile communication devices, workers are more likely to be on the road and not in the office. This tendency can lead to conference calls, but conference calls have significant limitations, especially when compared to face-to-face meetings. What is needed in the art is a more intuitive communication management interface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communication session management in the context of persistent virtual meeting rooms represented graphically as a communication session. A companion case, U.S. patent application Ser. No. 12/749,028, filed on Mar. 29, 2010, discloses a graphical interface which enables a user to setup a communication session with various users and tear down or remove users from a communication session. A system and method are disclosed which displays on a graphical user interface a set of graphical connected elements representing a structure of a particular communication session or group of communication sessions for a user. A brief introductory description with reference to FIG. 2 will be provided, followed by a discussion of a basic general purpose system in FIG. 1 which can be employed to practice the concepts disclosed herein and more detailed descriptions of methods and graphical interfaces.

Figure 2:
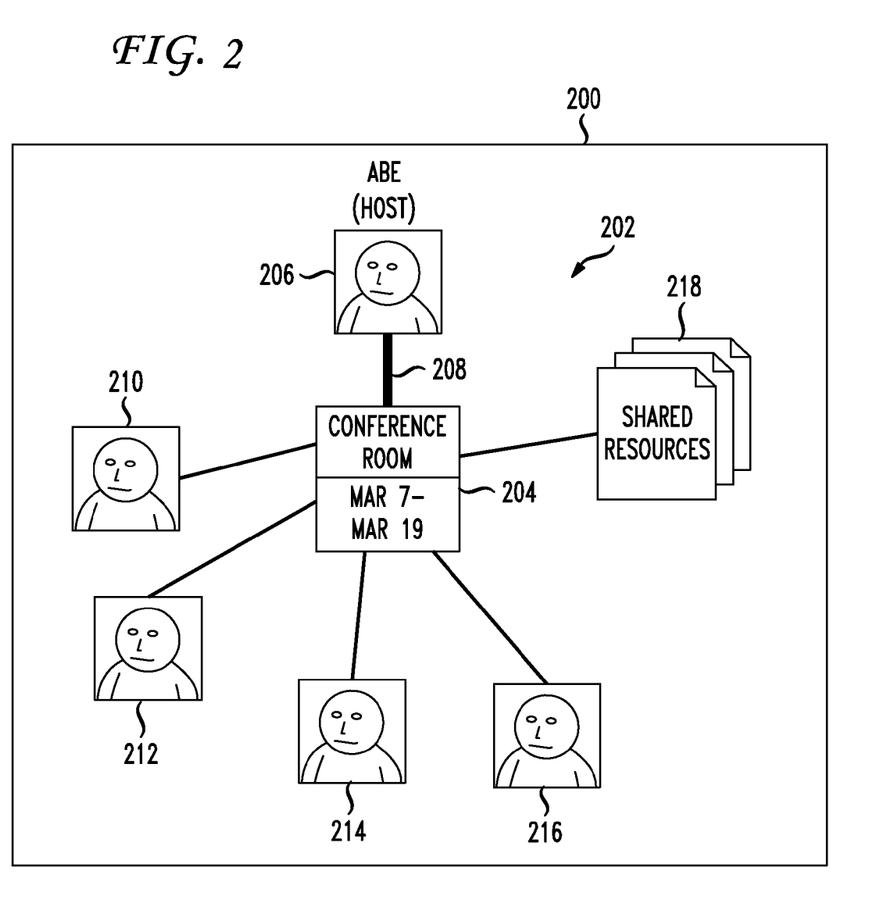
FIG. 2 illustrates an exemplary virtual conference room communication session.

Presenting the graphical interface of FIG. 2, which illustrates the virtual meeting room communication session, enables the system to receive via the interface user input, which can include multimodal user input, to manage the communication session. For example, a user in a virtual meeting room can drag and drop or otherwise move and locate from a contacts list another person to add to the virtual meeting room. The system receives that input and automatically dials the phone number for that contact (or contacts them via another communication modality) and adds them to the conference call. Users can be dropped from the call by dragging a connected element representing the user to a trash bin or other icon representing deleting them from the communication session. An aspect of the virtual meeting room (and the communication session that occurred in the virtual meeting room) is that it can have a persistent characteristic. Information about the session such as contacts, documents, session control features such as splits and merges of the session, addition or removal of participants, and so forth can be maintained during and after the communication session. Information gathered in preparation for the communication session can be maintained as well. The persistent nature of the communication session can be dynamic as well to capture unanticipated ad hoc events as they arise.

The virtual meeting room communication session is also agnostic with respect to the mode of communication. The same metaphor of a connected user in a virtual meeting room communication session being displayed on the graphical interface can represent a called/calling user, an instant messaging (IM) user, an email user, a user connecting via video conferencing, shared virtual meeting room resources, and so forth. The presentation of the graphical elements, how they are connected and how the user interacts with the elements all vary depending on the needs and current active context of the communication session. For example, the elements can include text, titles, positions, data about each user, etc. and the connection metaphor between users can also represent information such as the type of connection (phone, video, etc), the quality of the connection (low-band, high-band, etc.), a hierarchy of how participants are related to the primary user (friend, associate, acquaintance, un-trusted user, etc.), a status of the connection (active, inactive, on-hold, etc.), and so forth. These variations shall be discussed throughout this disclosure. The disclosure now turns to FIG. 1.

Figure 1:
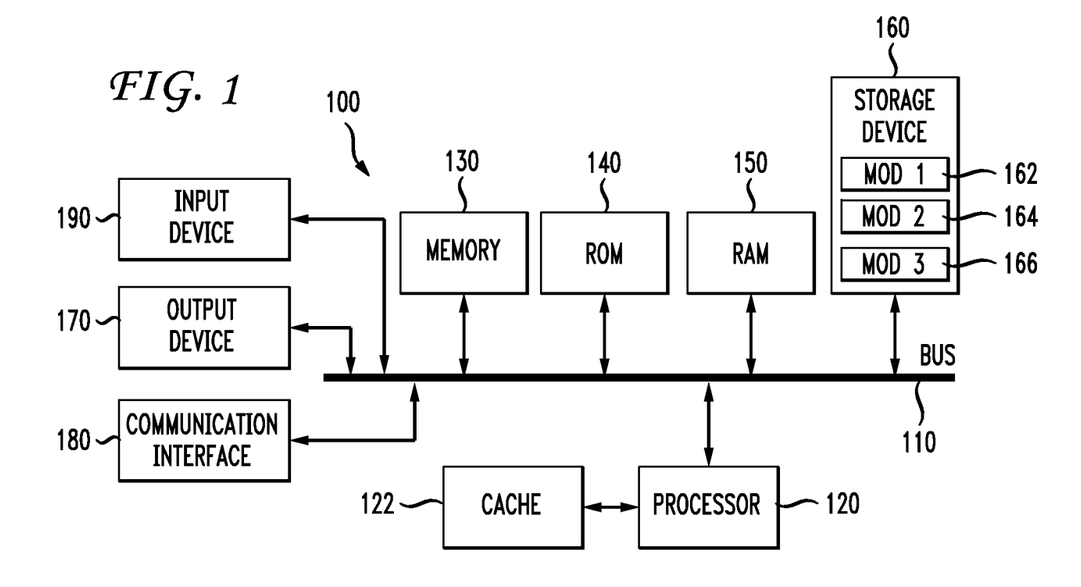
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. If the device includes a graphical display which also receives touch sensitive input, the input device 190 and the output device 170 can be essentially the same element or display. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having briefly discussed the exemplary system embodiment, the disclosure now turns to FIG. 2 and other graphical views of an interface for managing virtual conference room communication sessions. FIG. 2 illustrates a first graphical view of a virtual conference room communication session. In one aspect, participants join the communication session 202 via a simple telephone call. However, the communication session 202 is neutral with respect to various communication modalities and treats each the same. For example, the system 100 can transcode audio from a telephone call to text for a text messaging session via automatic speech recognition (ASR) and can convert in the other way via text-to-speech (TTS). A system 100, such as the one described in FIG. 1, can be configured to display a graphical user interface, such as the one described in FIG. 2, and receive input for manipulating the virtual conference room communication session. In one aspect, the system 100 interacts with a communications device, such as a telephone, instant messenger, personal or mobile computer, or email device. In another aspect, the system 100 integrates the functions of one or more communications device. The system 100 receives input via a physical or on-screen keyboard, mouse, stylus, touch screen, speech command, touchless gestures, and/or single-touch or multi-touch gestures. The system 100 can also receive multi-modal input. Before a virtual conference room communication session is established, the system 100 can show a blank home screen, optionally including graphical elements representing communications utilities. The blank screen can include a wallpaper image or other pattern. In one variation, the system 100 displays a summary or welcome page showing a short summary of news, messages, contacts, upcoming calendar events, and/or configuration options. In yet another variation, the system 100 displays a default input mechanism, such as a ten-key numeric pad for dialing telephone numbers.

The display 200 shows a virtual conference room communication session 202 of seven connected graphical elements: a virtual conference room hub 204, a host 206, participants 210, 212, 214, 216, and shared resources 218. In one aspect, the system overlaps or otherwise groups icons of conference participants who are in a same location or facility. Each participant in the communication session 202 or contact in a list of contacts can have multiple associated addresses, phone numbers, or points of contact, such as a work phone, home phone, mobile phone, work email, home email, AIM address, Facebook chat address, and the like and that each may have an icon or a qualifier such as a symbol that indicates not only the party but the contact mode. In such a case, information about the location can also be provided.

The displayed virtual conference room communication session 202 represents a real-time communication. In this case, the real-time communication is a virtual conference room hosted by Abe 206. The communication session in this example is already established. The host 206 can establish a communication session, for example, by selecting multiple contacts from a list of contacts and dragging them onto a conference icon, by double clicking on a contact to include that contact in an existing communication session, or by tapping on and sliding multiple contacts simultaneously or one at a time into a common area and clicking a "go" or "connect" button. The user can establish a virtual conference room through multiple user interface variations.

The communication session in the virtual meeting room can have a persistent component. Activities that occur prior to the communication session, during the session and after the session can persist in the space such that it can be retrievable at a later time. For example, parties can post a draft document in preparation for the communication session. Parties could access the document and make changes prior to the session. In the session, a particular group of participants will be involved. The document may change. A youtube video may be presented. Participants may join or be removed from the session. An audio recording and transcription of the conference can be recorded. A sidebar communication session may occur in which three participants spend 5 minutes discussing a side issue and then merge back with the main body of the communication session. Emails or instant messages may be posted from participants that could not make the session. Following the session, a revised document may need to be accessed and further revised. The participants may want to reactive the communication session and report on progress after having further modified the document.

All of the above-mentioned features and more can be tracked through the use of a persistent virtual meeting room. The system 100 tracks and records participants, documents, activities, session control, and all aspects of the communication session. The information can be stored and later accessed to reactive or recall the communication session with the various pieces of information remaining in a convenient location. For example, after the session concludes, a task item may be for one participant to revise the document that was discussed. The person can go to the persistent meeting room, update the document such that it remains in the room. Other users could then access the document from the same location. The participants are tracked as well so that the host or other user could reactive the meeting such that a time can be scheduled or on an adhoc basis the same group or subgroup can reconvene and carry out a follow-on session. All of the important data, transcriptions, recordings, different drafts of the document, etc. are available for review.

Participants 210, 212, 214, 216 are shown by connecting lines between their respective icons. The virtual conference room hub 204 can include additional information such as a title "Conference Room" and duration information "Mar 7-Mar 19". FIG. 2 is a graphical display of the conference call from Abe's 206 point of view. Other participants' display can vary from this display in form, layout, design, type of information, amount of information, and available or permitted options.

In order to establish a virtual conference room communication session, a host can drag and drop one or more contacts from a list of contacts into a blank area or onto a virtual conference room hub 204, dial a number directly via a physical or on-screen keypad, or type in an email address for example. The list of contacts can also include context based lists based on any kind of context. For example, one context could be previous meetings which were in a virtual meeting room and persistent. The user could search for one of the people in a previous meeting that was help and have the ability to have access to a persistent group of contacts from a pervious session. The user could then easily reactivate that session since all the users are previously grouped and identified. The graphical interface enables an easy way to reestablish the session.

When a user initiates a call, instant message, text message, videoconference, reactivated persistent session, or the like with another user, the system 100 establishes a connection to the other party and displays a graphical representation of the communication session with the other party on the screen. The user can then add additional parties to the communication session in a similar manner. The user can remove participants from a communication session by dragging them to a trash can icon, clicking an X associated with that participant, or clicking a physical or graphical disconnect button. In one aspect where the virtual conference room communication session is via telephone, the system 100 removes participants from the communication session when each participant hangs up the telephone receiver. As participants leave the communication session, the system 100 removes their icon from the graphical representation of the communication session. In a dynamically persistent meeting room, the system maintains a record of all session activity for later retrieval if necessary.

The graphical elements here are icons, but can also include images, text, video, animations, sound, caricatures, and/or avatars. Conference participants can personalize their own graphical elements or feed a live stream of images from a camera or video camera, for example. In addition, the graphical elements can have an associated string of text. The string of text can include a name, a title, a position, a telephone number, email address, a current status, presence information, location, and/or any other available information. The string of text can be separate from but associated with the graphical element. Alternatively, the system 100 can overlay the string of text on top of the graphical element or integrate the text as part of the graphical element. All or part of the text and/or the graphical elements can be hyperlinks to additional information related to the user associated with the text or graphical elements, such as a blog or micro blog, email address, presence information, and so forth.

The system 100 can include for each icon a graphical sub-element that indicates the communication mode for each participant, such as instant messaging (IM), telephone, and video conference. The system 100 is mode-neutral, meaning that the system 100 treats each mode of communication the same, such as telephone, cellular phone, voice over IP (VoIP), instant messaging, e-mail, text messaging, and video conferencing. As a user changes from one mode to another, the sub-elements can change accordingly. For example, if Abe 206 changes from a landline to a cellular phone mid-conference, a telephone icon associated with Abe's avatar or icon can change to a mobile phone icon.

The graphical elements can also convey information about the conference call by changing type, size, color, border, brightness, position, and so forth. The lines, for example, can convey relationships between participants. For example, the line 208 connecting Abe 206 to the virtual conference room hub 304 is thicker than the other lines, indicating that Abe 206 is the host. A user can manually trigger the changes for their own icon or others' icons, or the system 100 can detect change events and change the graphical elements accordingly. Change events can be based on a contacted party, context, persona, and/or presence.

For example, as one person is talking, the system 100 can enlarge their icon. As another example, the system 100 can track how much each person in the conference call is talking and move graphical elements up and down based on a total talk time in the conference call. In another example, a user's icon is more formal during business hours and more casual before or after business hours.

In another variation, the system 100 modifies the links connecting the graphical elements by changing their thickness, length, color, style, and/or animating the links. These modifications can represent a currently talking party, shared resources, an active communication session, a held communication session, a muted communication session, a pending communication session, a connecting communication session, a multi-party line, a sidebar conversation, a monitored transfer, an unmonitored transfer, selective forwarding, selective breakup of the communication session into multiple communication sessions, and so forth.

In one aspect, a user clicks and drags (or taps and drags with a touch screen) icons to manipulate the conference call. For example, the user can click a call icon, a video conference icon, an IM icon, an email icon, or a social media icon to invite another user to join the communication session. A user can drag these icons and drop them on a contact or on a participant in a current communication session. If an incoming communication session is in one modality (IM for example), the user can drag the call icon onto the incoming communication session to accept the incoming communication session but transcode it from IM to a call. An incoming call icon can blink, bounce, pulse, grow, shrink, vibrate, change color, send an audible alert (such as a ringtone), and/or provide some other notification to the user of the incoming call. The user can interact with and manipulate this incoming request in the same manner as the other current communication sessions. The system 100 does not differentiate between an active communication session and a communication session representing an incoming call. A user can also initiate a communication session by dragging and dropping an appropriate icon onto a contact. Social media include web sites such as Facebook, Twitter, LinkedIn, MySpace, and so forth. Alternatively, the user can browse through a list of contacts, then drag and drop a desired contact to add the desired contact to the conference call. The system 100 then automatically contacts that person in their desired mode, a sender preferred mode, a currently available mode based on presence information, or in a common available mode between the participants and joins that person to the conference call. The system 100 can display other information as well, such as a calendar, notes, memos, personal presence information, and time. The system 100 display can be user-configurable.

In another aspect, user preferences guide the amount and type of information conveyed by the graphical elements and the associated text. User preferences can be drawn from one or more conference participants' preferences. Preferences can also be established related to the persistent nature of the session. For example, the host can maintain a dynamic record of all events or only record and make persistent the final state such as the final version of shared documents and the final listing of participants. User controls can turn on and off the persistent features. In one case, the host can turn on a persistent characteristic for a split communication session and all documents associated with the split session. If that split session then is merged back with a primary communication session, then the persistent characteristic can end and only the split session is persistent.

Different charges for different capabilities can be charged as well. For example, a service provider may charge more to maintain a running history that is persistent for the virtual meeting room that includes session control interactions such as dividing a communication session into multiple sessions.

One possible user input is to divide the communication session shown in FIG. 2. The user can draw a line with a mouse drag or a finger on a touch screen separating the communication session into two groups. The system 100 can then divide the communication session into two separate concurrent communication sessions based on the groups. In one aspect, a communication session manager can divide a communication session for a limited time, after which the communication sessions are automatically merged together. For example, a manager can say "Team A, discuss pros and cons of strategy A. Team B, discuss pros and cons of strategy B. After five minutes, we'll return and report on our discussions." Then the manager draws a line or otherwise selects groups for the breakout sessions and sets a duration. A dialog or icons can appear when the communication session is separated which present the available options for managing the separation. The system 100 divides the communication session and rejoins them after the set duration. This concept is explored more fully in FIGS. 4A and 4B.

The manager can indicate additional settings, such as prohibiting sidebar conversations between the groups during the breakout sessions. The manager can be independent of the breakout sessions and monitor each breakout session via audio, summary, and/or real-time text.

Figure 3:
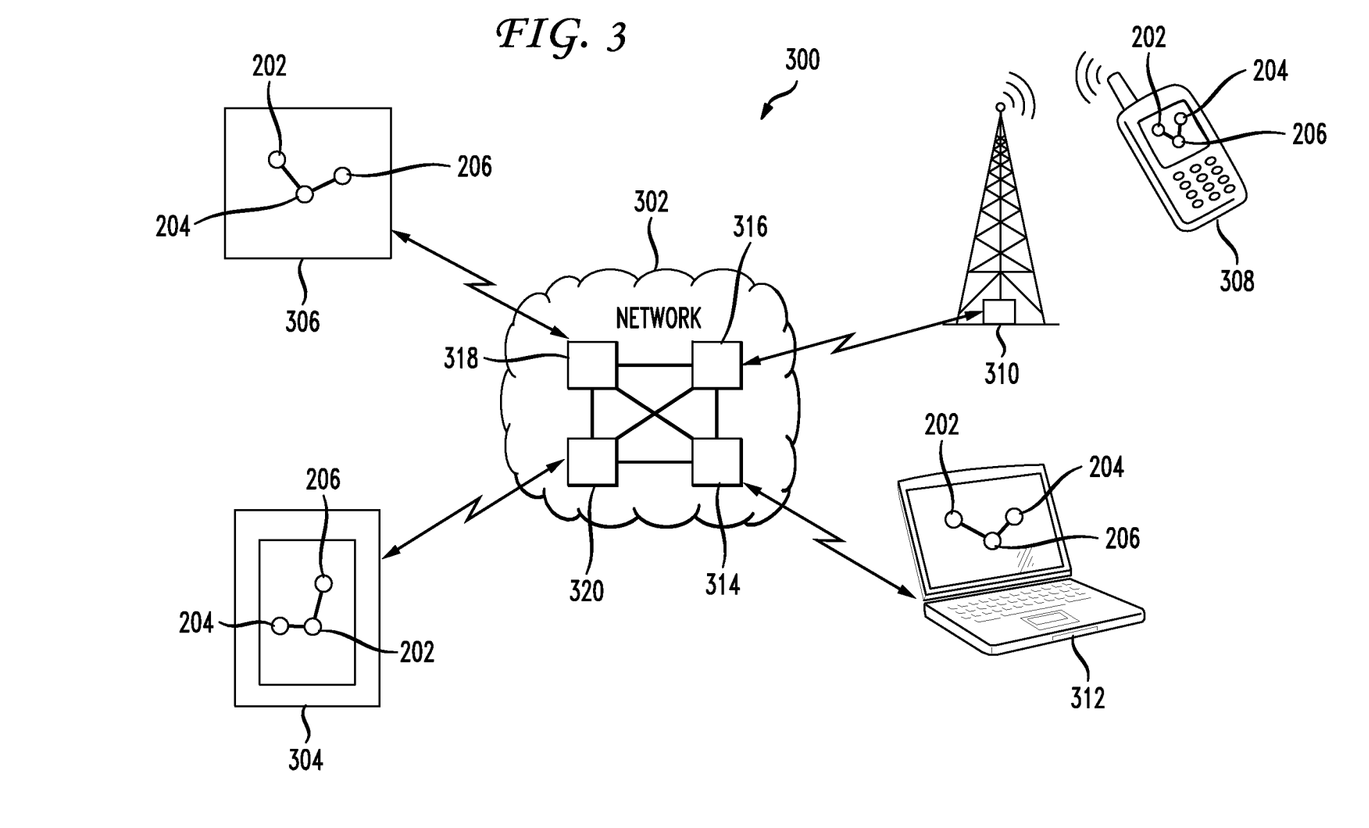
FIG. 3 illustrates an example network view of the virtual conference room communication session.

Having discussed several variations of FIG. 2, the discussion now turns to a network view 300 of the communication session as shown in FIG. 3. A telecommunications network 302 connects various communications devices 304, 306, 308, 310, 312 and conveys information from device to device. The telecommunications network can be one of or a combination of a plain old telephone service (POTS) network, an asynchronous transfer mode (ATM) network, an integrated services digital network (ISDN), frame relay network, Ethernet network, token ring network, and any other suitable wired or wireless network. The network can include one or more interconnected nodes 314, 316, 318, 320 which perform all or part of the connection and transmission functionality that underlies the graphical representation of communication sessions on a GUI. Such network nodes 314, 316, 318, 320 can perform all the functionality in the network 302 or can operate in conjunction with end-user communication devices 304, 306, 308, 312 to manipulate communication sessions.

In one aspect, a centralized entity controls the communication session. The centralized entity can reside in the network or communicate via the network. The centralized entity can operate as a centralized enterprise intelligence server. In another aspect, the communication session control and functionality is distributed among multiple server resources 314, 316, 318, 320 in the network or cloud. In addition to a centralized intelligence and distributed intelligence in the cloud, the network 302 can provide this functionality using a peer-to-peer approach with intelligence on the endpoints. Some variations include providing standardized functionality on a standards-compliant server and non-standardized functionality distributed across the endpoints.

The display of each communications device shows a different aspect or view of the same communication session. For example, the display of device 304 shows the same display of the same participants 202, 204, 206. The display of device 306 shows the same participants 202, 204, 206 in a different view of the communication session from the perspective of device 306. Likewise devices 308 and 312 show the same participants 202, 204, 206 in different views. In one aspect, a mobile device 308 connects with a wireless transmitter 310 to connect to the network. A mobile device 308 can generate its own view of the communication session or it can generate a duplicate or a companion view of another device's display.

Figure 4A:
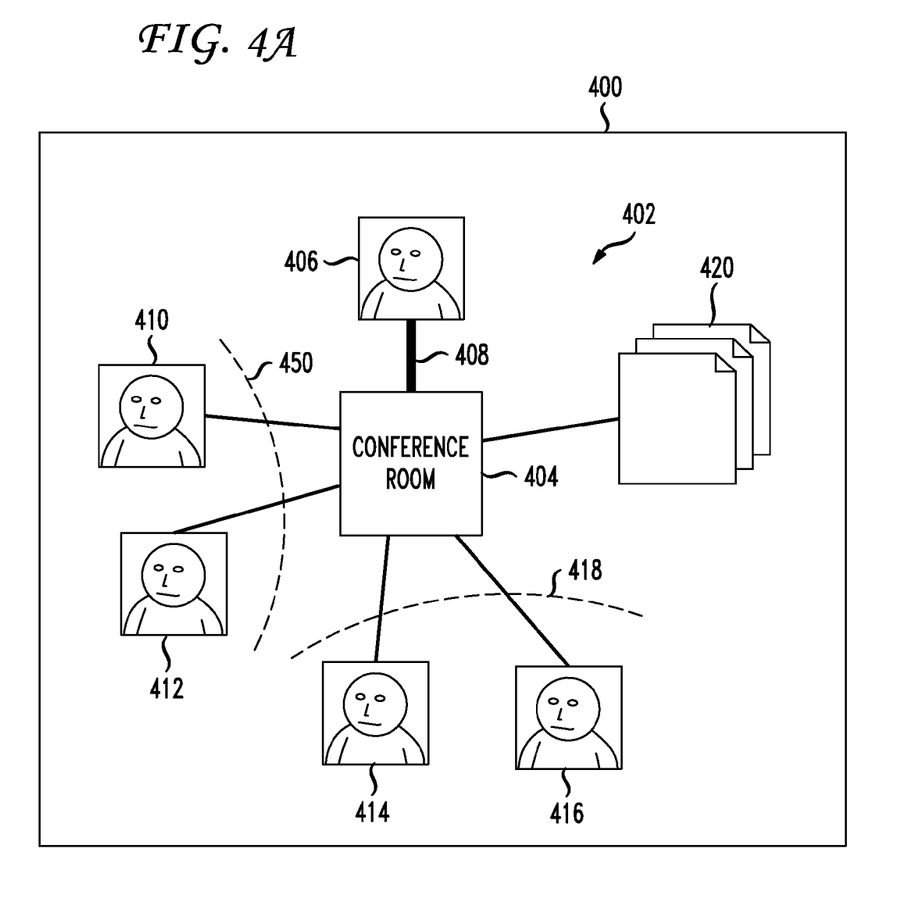
FIG. 4A illustrates actions to divide the virtual conference room communication session.

FIG. 4A illustrates actions to divide the virtual conference room communication session 402. The system outputs on a display 400 graphical elements 404, 406, 408, 410, 412, 414, 416 representing a virtual conference room communication session and shared resources 420 as part of the virtual conference room. The host 406 or another participant draws a first line 418 with his or her finger on a touch screen (or provides other suitable input) separating participants 414, 416 in one group and draws a second line 450 separating participants 410, 412 in another group. These different groups can be characterized as sidebar discussions and have various levels of connection with the main conference room 404. The system identifies the two groups and divides the participants based on the input, as shown in FIG. 4B.

Figure 4B:
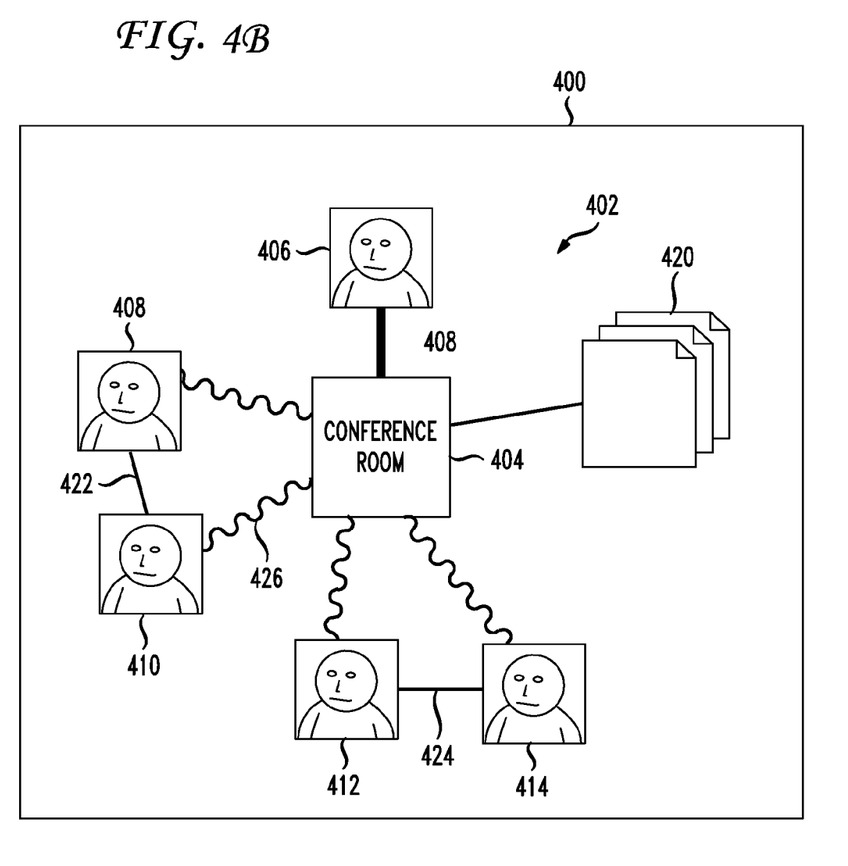
FIG. 4B illustrates an exemplary result of the actions shown in FIG. 4A.

FIG. 4B illustrates an exemplary result of the actions shown in FIG. 4A. The division can be for the duration of the virtual conference room communication session or temporary, such as for a predetermined length of time or until the host 406 rejoins the virtual conference room session. The host 406 can determine how each divided group of the virtual conference room communication session can access all or part of the shared resources 420. For example, the sidebar session 424 can be allowed to view/manage/change pages 1-20 of the shared resources 420 while sidebar 422 be given access only to view pages 21-40. The host 406 can also disallow sidebars between participants in other divided portions of the virtual conference room communication session and/or automatically set up a sidebar 422, 424 for each divided portion.

The system 100 can change the appearance of the lines 426 connecting each divided portion to the virtual conference room hub, such as changing the lines from straight to wavy, to indicate that the virtual conference room is divided. In one aspect, each divided group is completely separated from other participants such that they can neither hear nor see what is going on in the other groups. The system can also reduce the audio from the main conference 404 such that the sidebars are not bothered by the sound but if the host were to simply speak up ("Are you ready to join us again?"), then the sidebar groups could hear and respond. In another aspect, the system introduces an additional icon (not shown) between each user's icon and the virtual conference room hub icon 404 providing division related information. After a predetermined time, upon receiving input from the host 406, or upon receiving input from one or more participant 410, 412, 414, 416, the system 100 recombines the divided virtual conference room communication session and optionally terminates the established sidebars 422, 424.

The ability therefore to manage the access to the shared documents or data 420 can be managed via the graphical user interface in an easy fashion as the communication session 402 is modified in various ways. For example, if the sidebar session 424 is to edit a portion of the document 420, the host could drag and drop a page or group of pages from position 420 onto the sidebar participants to make that assignment. Other pages could be dragged and dropped to assign to the sidebar 422.

Figure 5:
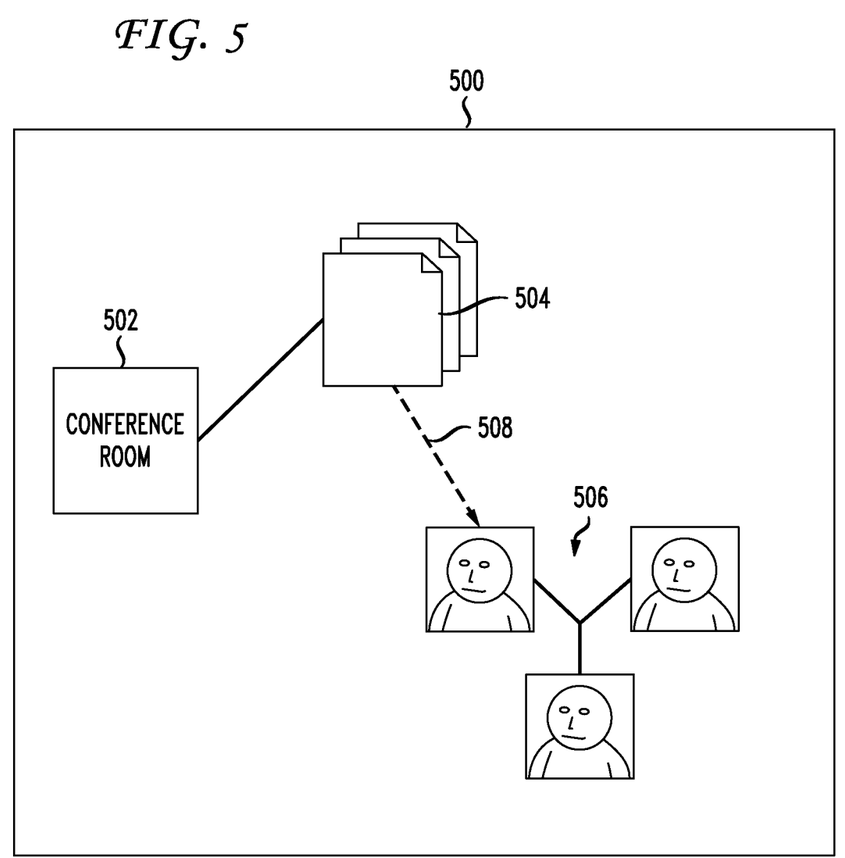
FIG. 5 illustrates accessing resources in the virtual conference room through a separate communication session.

FIG. 5 illustrates accessing resources 504 in the virtual conference room 502 through a separate communication session 506. The virtual conference room communication session 502 and the shared resources 504 of the virtual conference room persist even with no active participants. A user in a separate communication session 506 can see in his or her display 500 a representation of the empty virtual conference room 502 and the shared resources 504. The user can select one of the shared resources and drag 508 or otherwise move and locate it in to the separate communication session 506 to share with other participants. The security and access permissions of the shared resources 504 in the separate communication session 506 can be read only, read-write, or based on a maximum permission level of any of the participants in the separate communication session, for example. In another variation, the system 100 creates local copies of the shared resources 504 in the virtual conference room 502 for use by the separate communication session 506. In this way, the participants in the separate communication session can modify the local copies without altering the original shared resources 504. In one aspect, the communication session 506 is displayed with an additional non-person graphical icon that is not the same as the shared resources 504, but represents access to the shared resources 504.

Figure 6:
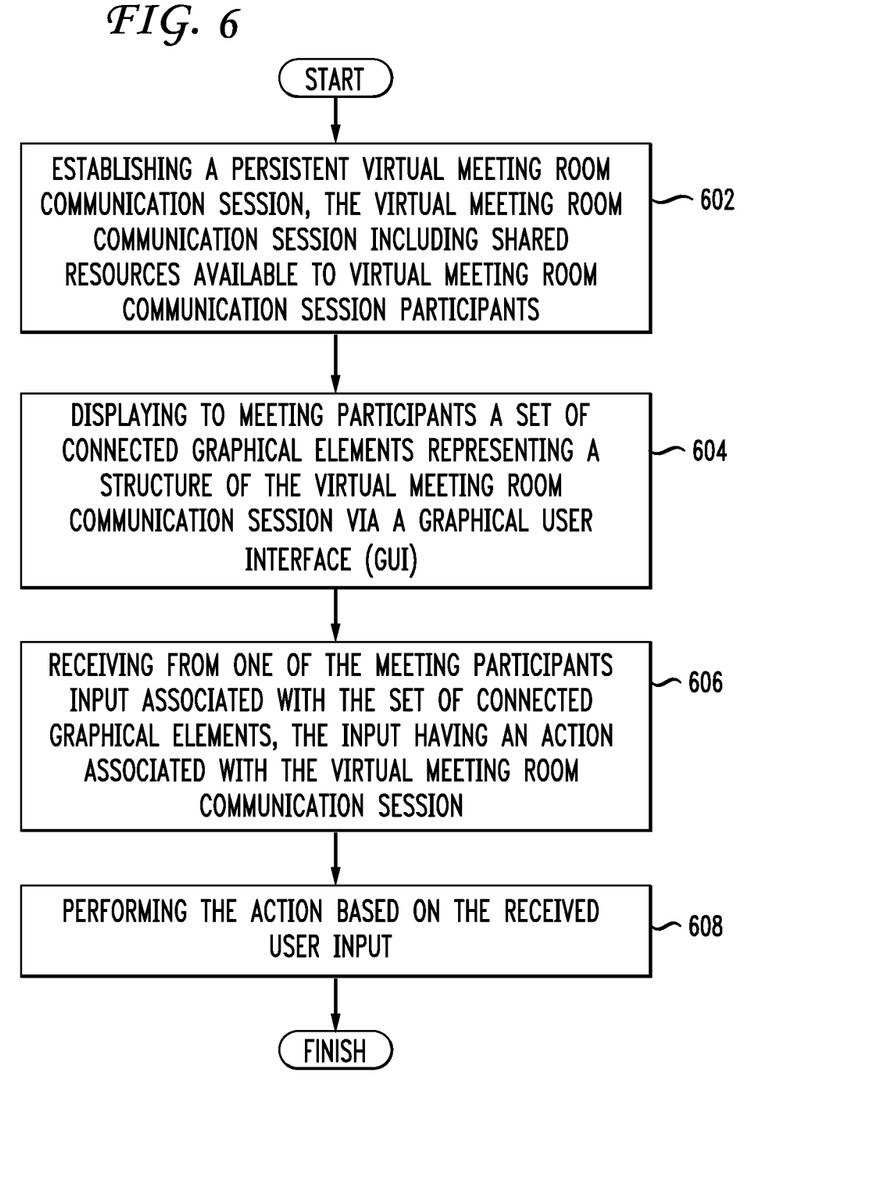
FIG. 6 illustrates an example method embodiment.

The disclosure now turns to the exemplary method embodiment shown in FIG. 6. For the sake of clarity, the method is discussed in terms of an exemplary system such as is shown in FIG. 1 configured to practice the method.

The system 100 establishes a persistent virtual meeting room communication session, the virtual meeting room communication session including shared resources available to virtual meeting room communication session participants (602). The persistent virtual meeting room communication session can have an associated scheduled start time, scheduled end time, and/or scheduled duration. In one aspect, the virtual meeting room communication session persists when no participants are in the communication session. The virtual meeting room communication session and its shared resources appear in the GUI of potential participants in the virtual meeting room even though it is empty. This allows participants to access shared resources without being in the virtual meeting room communication session. Share resources can include a service, an application, materials, current materials or data, an agenda, and/or document version control. The respective displays of each participant in the virtual meeting room depict each shared resource as a graphical element such as an icon. These icons can be connected to the virtual conference room communication session in the same manner as a live participant. The respective display of each participant only depicts shared resources to which the participant is allowed access. Shared resources can have an associated access level on a per participant or per group basis, such as read only, read-write, write access without read access, and so forth. In another aspect, the virtual meeting room persists only as long as a meeting room host is participating or as long as a meeting room host designates. As noted above, the persistent nature can be provided in various levels and over certain time periods. For example, the virtual meeting room can be persistent for activity before, during and after the communication session such that all session activity can be later retrieved and the session reactivated.

The system 100 displays to meeting participants a set of connected graphical elements representing a structure of the virtual meeting room communication session via a graphical user interface (GUI) (604). Graphical elements representing a particular participant can indicate one or more of permissions, capabilities, and available communication modalities of the particular participant.

The system 100 receives from one of the meeting participants input associated with the set of connected graphical elements, the input having an action associated with the virtual meeting room communication session (606) and performs the action based on the received user input (608). In one aspect, the meeting room host has full permissions to manipulate all aspects of the virtual meeting room communication session and non-host participants have limited permissions to manipulate the virtual meeting room communication session.

The persistent nature of the virtual meeting room can remain or "persist" based on a variety of factors. For example, the virtual room can persist based on an outcome of the communication session. The host can provide user input indicating that it should persist for 1 hour or 1 week such that participants to refer back to the session and documents and make further changes and report back. The communication session can persist as long as a meeting room host participates in the communication session or as long as a quorum of participants is active in the session. For example, an organization may have a by-law that requires a quorum to make changes to particular documents. As long as the quorum exists, the meeting room can persist. All or part of the shared documents may be excluded based on such factors. For example, the agenda may remain but a shared document with respect to by-laws or corporate structure, which can only be modified based on a quorum, may be excluded.

The meeting room can persistent based on dynamic factors as well, such as if the CEO comes onto the call or if a document changes, or if any ad-hoc sidebars get established, if an automatic speech recognition system detects certain words or instructions ("Let's save this document for later revision.") or based on any other triggering event in the communication session.

In another aspect, the host can arrange the persistent session to have other triggers that either maintain its persistent nature or close down the session. A "final" button could be left in the session which is persistent until users continue to modify the document 420 until it is in final shape. Then the user could provide input to click the "final" button thus closing down the persistent session. This operation could also automatically notify the participants of the finality of the document and take other actions, such as schedule a follow up session.

In this regard, a variety of persistent button options can be included within the persistent session for session control. Other mechanisms can be employed as well. Controls for persistent sessions can include maintaining persistent session output or byproducts. Voice recordings, meeting nodes, produced, modified or presented documents, text messaging history, transcriptions, video recordings, etc. can be stored and available in a persistent session. These are generally represented in FIG. 4A as documents 420.

Such information that persists also can include contact information for participants in the persistent session. In many respects, a communication session is not the only session for a particular topic or document. The participants often require a follow up reporting session. The persistent session can maintain all the contact information for the later session and the conference can be easily reactivated with all or a subset of the participants for continued discussion and working on the shared resources. Another features that applies in this context is the ability of the system 100 to maintain updated contact information for the participants in a persistent session. For example, if John participated in a session and he is maintained as part of the persistent nature of the session, but prior to a follow up session changed his email address and telephone number, the system can automatically update the contact information within the persistent session such that when the session is reactivated, the current information for all participants is readily available.

The persistent nature of a session can also be dynamic with respect to session control and while the session is in progress. For example, persistency settings can automatically be applied to scheduled and ad-hoc conferences. The persistency can apply to meeting preparation such that participants can post or provide in some mechanism documents for the session in advance or after a meeting wrap up. In another example, assume participant 416 in FIG. 4A desires to add a document to the persistent session. User 416 could drag and drop a browsed document onto the hub 404 and include that document in the shared documents 420.

Furthermore, the persistent nature of a session can also be maintained for sidebar sessions or separated sessions based on the session control. A session history can also be part of the persistent nature and data of a session to track the communication context with respect to participants be added and removed, or the session splitting and merging, or if a precipitant or participants changed communication mode, etc. While various changes can occur through session control, the shared resources and communication history can persist.

The persistent nature of the participants in a communication session can be tapped by users at a later time as well. Contact lists or robot lists or functional robots performing specific functions can utilize this information. For example, a display such as interface 400 in FIG. 4A could include a contacts or other type of list that is organized by context. One context could be based on a persistent session. The user could organize the contact based on conference calls chronologically. Thus, they could easily identify which call they were on three weeks ago and the contact list for that call could include all of the documents, communication history, current information for the participants in that call, any updates to documents after the meeting wrap up, and so forth. From this contacts list, the same session could be reinstated or reactivated with all the necessary information easily available and accessible to the participants.

This contact list could be presented after a communication session in the same graphical image as the communication session itself. For example, the display 400 of FIG. 4A can persist such that one of the participants can easily reactivate the session or select particular participants to start a new session with a subset of participants. The session control history could also be presented and managed. For example, the user may be able to have a "play" button in which the history of the session control is shown. Sidebars, splitting, merging, documents or shared resource use and modification, and any other session control history features can be played. The user can then pause and reactive the session with desired participants and even desired documents. For example, the user could access and earlier draft of a document since that was the draft which was being used 20 minutes into the session and that draft is maintained as part of the persistent session.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   establishing, via a processor, a persistent virtual meeting room communication session, the persistent virtual meeting room communication session comprising shared resources available to virtual meeting room communication session participants, wherein the persistent virtual meeting room communication session and the shared resources persist when no participants are in the virtual meeting room communication session;
   displaying to meeting participants a set of connected graphical elements representing a structure of the persistent virtual meeting room communication session via a graphical user interface, wherein the set of connected graphical elements comprises a hub graphical element representing a virtual meeting room, a set of participant graphical elements representing the meeting participants, and a set of resource graphical elements representing the shared resources, and wherein the set of participant graphical elements and the set of resource graphical elements are connected to the hub graphical element;
   receiving, via the processor, from a meeting participant, input associated with the set of connected graphical elements, the input having an action associated with the persistent virtual meeting room communication session; and
   performing, via the processor, the action based on the received user input.

2. The method of claim 1, wherein the persistent virtual meeting room communication session has at least one of a scheduled start time, a scheduled end time, or a scheduled duration.

3. The method of claim 1, wherein the shared resources comprise a state, and wherein the state comprises a document, a user activity, user-generated data, and session control data.

4. The method of claim 1, wherein the persistent virtual meeting room communication session maintains a state of the persistent virtual meeting room communication session after a participants' communication session is terminated.

5. The method of claim 1, wherein a meeting room host has full permissions to manipulate the persistent virtual meeting room communication session.

6. The method of claim 5, wherein non-host participants have limited permissions to manipulate the persistent virtual meeting room communication session.

7. The method of claim 1, wherein shared resources comprise at least one of a service, an application, materials, an agenda, or document version control.

8. The method of claim 1, wherein the set of participant graphical elements and the set of resource graphical elements are connected to the hub graphical element with a plurality of connecting lines.

9. The method of claim 8, wherein an appearance of the connecting lines changes to indicate that the persistent virtual meeting room communication session is divided.

10. The method of claim 1, wherein the persistent virtual meeting room communication session persists as long as the shared resources are available in the virtual meeting room.

11. The method of claim 1, wherein the persistent virtual meeting room communication session persists based on an output of the persistent virtual meeting room communication session.

12. The method of claim 1, wherein the persistent virtual meeting room communication session is inactive, and wherein the action is to reactivate the persistent virtual meeting room communication session.

13. The method of claim 1, wherein the persistent virtual meeting room communication session persists for at least one of a preparation phase or a wrap-up phase.

14. The method of claim 1, wherein the persistent virtual meeting room communication session includes a sidebar communication session.

15. The method of claim 1, the method further recording an interaction history within the persistent virtual meeting room communication session.

16. The method of claim 15, wherein the interaction history comprises at least one of participant activity, session output, byproducts, voice recording, meeting nodes, text messaging history, transcriptions, video recordings, produced documents, modified documents, or presented documents.

17. The method of claim 15, the method further comprising presenting at least a portion of the interaction history based on a user request.

18. The method of claim 17, wherein the interaction history comprises at least one of session control, a history of splitting events, or a history of merging events.

19. The method of claim 1, further comprising recording information regarding participants in the persistent virtual meeting room communication session.

20. The method of claim 19, further comprising updating information regarding participants in the persistent virtual meeting room communication session.

21. The method of claim 19, wherein the information regarding participants in the persistent virtual meeting room communication session is contact information.

22. A system comprising:
a processor; and
a computer-readable storage medium having stored therein instructions which, when executed by the processor, cause the processor to perform operations comprising:
establishing a persistent virtual meeting room communication session, the persistent virtual meeting room communication session comprising shared resources available to persistent virtual meeting room communication session participants, wherein the persistent virtual meeting room communication session and the shared resources persist when no participants are in the virtual meeting room communication session;
displaying to meeting participants a set of connected graphical elements representing a structure of the persistent virtual meeting room communication session via a graphical user interface, wherein the set of connected graphical elements comprises a hub graphical element representing a virtual meeting room, a set of participant graphical elements representing the meeting participants, and a set of resource graphical elements representing the shared resources, and wherein the set of participant graphical elements and the set of resource graphical elements are connected to the hub graphical element;
receiving, from a meeting participant, input associated with the set of connected graphical elements, the input having an action associated with the persistent virtual meeting room communication session; and
performing the action based on the received user input.

23. The system of claim 22, wherein the persistent virtual meeting room communication session has at least one of a scheduled start time, a scheduled end time, or a scheduled duration.

24. The system of claim 22, wherein the shared resources comprise a state, and wherein the state comprises at least one of a document, a user activity, user-generated data, or session control data.

25. The system of claim 22, wherein the persistent virtual meeting room communication session maintains a state of the persistent virtual meeting room communication session after a participants' communication session is terminated.

26. The system of claim 22, wherein a meeting room host has full permissions to manipulate the persistent virtual meeting room communication session.

27. The system of claim 26, wherein non-host participants have limited permissions to manipulate the persistent virtual meeting room communication session.

28. A computer-readable storage device storing instructions which, when executed by a processor, cause the processor to perform operations comprising:
establishing a persistent virtual meeting room communication session, the persistent virtual meeting room communication session comprising shared resources available to persistent virtual meeting room communication session participants, wherein the persistent virtual meeting room communication session and the shared resources persist when no participants are in the virtual meeting room communication session;
displaying to meeting participants a set of connected graphical elements representing a structure of the persistent virtual meeting room communication session via a graphical user interface, wherein the set of connected graphical elements comprises a hub graphical element representing a virtual meeting room, a set of participant graphical elements representing the meeting participants, and a set of resource graphical elements representing the shared resources, and wherein the set of participant graphical elements and the set of resource graphical elements are connected to the hub graphical element;
receiving, from a meeting participant, input associated with the set of connected graphical elements, the input having an action associated with the persistent virtual meeting room communication session; and
performing the action based on the received user input.

29. The computer-readable storage device of claim 28, wherein the shared resources comprise at least one of a service, an application, materials, an agenda, or document version control.

30. The computer-readable storage device of claim 28, wherein the set of participant graphical elements and the set of resource graphical elements are connected to the hub graphical element with a plurality of connecting lines.

31. The computer-readable storage device of claim 30, wherein an appearance of the connecting lines changes to indicate that the persistent virtual meeting room communication session is divided.

32. The computer-readable storage device of claim 28, wherein graphical elements representing a particular participant indicate at least one of permissions, capabilities, or available communication modalities of the particular participant.

* * * * *